United States Patent [19]  [11] 3,940,470
Kane et al. [45] Feb. 24, 1976

[54] DIRECT RECOVERY OF METALS FROM FLUID ANHYDROUS METAL HALIDES DERIVED FROM MARINE NODULE HALIDATION

[75] Inventors: William S. Kane, Wicomico; Hugh L. McCutchen, Gloucester Point; Paul H. Cardwell, Zanoni, all of Va.

[73] Assignee: Deepsea Ventures, Inc., Gloucester Point, Va.

[22] Filed: Nov. 29, 1972

[21] Appl. No.: 310,605

[52] U.S. Cl. .................. 423/24; 423/32; 423/44; 423/46; 423/49; 423/139; 423/149; 423/150; 423/491; 423/493; 75/.5 A
[51] Int. Cl.$^2$... C01G 3/00; C01G 45/00; C01G 51/00; C01G 53/00
[58] Field of Search ......... 75/72, 82, 111, 112, 109, 75/117, 119, 121, 63; 423/138, 139, 149, 150, 44, 24, 240, 491, 46, 49; 55/71, 72

[56] References Cited
UNITED STATES PATENTS

| | | | |
|---|---|---|---|
| 2,030,867 | 2/1936 | Hart | 75/112 |
| 2,030,868 | 2/1936 | Hart | 75/112 |
| 2,396,793 | 3/1946 | Kroll | 75/63 |
| 2,452,665 | 11/1948 | Kroll et al. | 423/49 |
| 2,647,830 | 8/1953 | Allen et al. | 423/32 |
| 2,658,813 | 11/1953 | Whitehouse et al. | 423/49 |
| 2,677,594 | 5/1954 | Graham et al. | 75/82 |
| 2,752,299 | 6/1956 | Cooper | 423/49 |
| 3,853,981 | 12/1974 | Hadzeriga | 423/24 |

FOREIGN PATENTS OR APPLICATIONS

| | | | |
|---|---|---|---|
| 520,396 | 1/1956 | Canada | 423/240 |

*Primary Examiner*—Oscar R. Vertz
*Assistant Examiner*—Brian E. Hearn
*Attorney, Agent, or Firm*—Barry G. Magidoff

[57] ABSTRACT

This invention provides a process for separating metal values from an anhydrous mixture of metal halides in a fluid state, i.e. vapor or liquid; the separation is made by contacting a fluid mixture containing a halide of at least one less-noble metal selected from the group consisting of iron and manganese, and a halide of at least one more-noble metal selected from the group consisting of copper, cobalt and nickel, with an elemental metal. This procedure is especially effective in the refining of ocean floor nodule ores.

16 Claims, No Drawings

DIRECT RECOVERY OF METALS FROM FLUID ANHYDROUS METAL HALIDES DERIVED FROM MARINE NODULE HALIDATION

With the increased awareness on the part of both the public and the metals industry of the ecological dangers that can arise from continued surface mining of minerals and the increased problems of pollution caused by the refining procedures required for most ores mined from the land, industry has been interested for several years now in the mining of minerals from the sea. This has been an extremely elusive target up to the present. The directions taken have included both attempts to wrest minerals directly from solution in sea water and the mining of ores which are available on the floor of the ocean. These ores do not require any digging into or stripping of the earth's crust; the ocean floor ores can merely be scooped up or in other ways removed from the ocean floor without actually rending the earth's surface.

Ocean floor nodules were first collected in the first half of the 1870's. They have been studied by many workers in an attempt to determine their composition, and after their composition had been determined to try to decipher ways to wrest from their peculiar structure the valuable metals contained therein. It is presently believed that these nodules are actually creations of the sea; It is presently believed that these nodules are actually creations of the sea; they are somehow grown from the metal compounds which are dissolved in sea water, generally in the form of the metal oxides.

The metal values in the nodules are almost exclusively in the form of the oxides and moreover are present in a very peculiar physical configuration. The physical and chemical structure of the nodules are believed to be a direct result of the conditions under which they are created and to which they have been exposed since their creation. The nodules have never been exposed to temperatures other than those at the bottom of the ocean at the location at which they were formed. They have an extremely large surface area, often better than 50 porosity and they are thus a relatively chemically reactive ore.

The nodules are formed in an extremely complex crystal matrix of iron and manganese oxides: tiny grains of each oxide of a size and type which are substantially impossible to separate with presently available physical means. These iron and manganese oxides form the crystalline structure within which are held, by means not precisely known, other metal compounds, most likely oxides, including those of nickel, copper and cobalt, as the main ingredients, followed by chromium, zinc, tin, vanadium, and many more elements, including the rare metals silver and gold.

The precise chemical composition of the nodules vary depending upon their location in the ocean. The variation apparently is caused by differences in temperature in various places; differences in composition of sea water; perhaps caused by the pressure and temperature variations at different depths and composition of adjacent land areas; variations in the amount of oxygen which is present in the water in different locations and perhaps other variables not readily apparent to observers. Generally, however, in almost all cases, the metals which are present in major proportions are manganese and iron. The following table (taken from the article entitled "The Geochemistry of Manganese Nodules and Associated Deposits from the Pacific and Indian Oceans" by Croonan and Tooms in *Deep Sea Research* (1969), *Volume* 16, pages 335 – 359, Pergamon Press (Great Britain) shows the relative compositions of the most valuable metals contained in nodules taken from different areas within the Pacific and Indian Oceans.

Table I

|  | 1 | 2 | 3 | 4 | 5 | 6 | 7 | 8 | 9 |
|---|---|---|---|---|---|---|---|---|---|
| Mn | 13.96 | 16.87 | 15.71 | 15.85 | 22.33 | 19.81 | 16.61 | 13.56 | 15.83 |
| Fe | 13.10 | 13.30 | 9.06 | 12.22 | 9.44 | 10.20 | 13.92 | 15.75 | 11.31 |
| Ni | 0.393 | 0.564 | 0.956 | 0.348 | 1.080 | 0.961 | 0.433 | 0.322 | 0.512 |
| Co | 1.127 | 0.395 | 0.213 | 0.514 | 0.192 | 0.164 | 0.595 | 0.358 | 0.153 |
| Cu | 0.061 | 0.393 | 0.711 | 0.077 | 0.627 | 0.311 | 0.185 | 0.102 | 0.330 |
| Pb | 0.174 | 0.034 | 0.049 | 0.085 | 0.028 | 0.030 | 0.073 | 0.061 | 0.034 |
| Ba | 0.274 | 0.152 | 0.155 | 0.306 | 0.381 | 0.145 | 0.230 | 0.146 | 0.155 |
| Mo | 0.042 | 0.037 | 0.041 | 0.040 | 0.047 | 0.037 | 0.035 | 0.029 | 0.031 |
| V | 0.054 | 0.044 | 0.036 | 0.065 | 0.041 | 0.031 | 0.050 | 0.051 | 0.040 |
| Cr | 0.0011 | 0.0007 | 0.0012 | 0.0051 | 0.0007 | 0.0005 | 0.0007 | 0.0020 | 0.0009 |
| Ti | 0.773 | 0.810 | 0.561 | 0.489 | 0.425 | 0.467 | 1.007 | 0.820 | 0.682 |
| L.O.I. | 30.87 | 25.50 | 22.12 | 24.78 | 24.75 | 27.21 | 28.73 | 25.89 | 27.18 |
| Depth (m) | 1757 | 5001 | 5049 | 1146 | 4537 | 4324 | 3539 | 3793 | 5046 |

1. Mid-Pacific Mountains(5 samples)
2. West Pacific(23 samples)
3. Central Pacific(9 samples)
4. Southern Borderland Seamount Province(5 samples)
5. Northeast Pacific(10 samples)
6. Southeast Pacific(8 samples)
7. South Pacific(11 samples)
8. West Indian Ocean(10 samples)
9. East Indian Ocean(14 samples)

Nodules are also found in the Atlantic Ocean; however, it has been found that generally these nodules contain low amounts of the more valuable metals and correspondingly higher proportions of the less desirable metals which cannot be readily refined and which have little or no value, such as the alkaline earth metals.

Because of the peculiar and intricate crystal structure of the ocean floor nodules, the common refining techniques used for the refining of land ores are not generally suitable for the nodules. The art has struggled with various schemes for refining these nodules but it is only recently that processes have been devised which permit the commercial refining of these nodules to obtain economically significant quantities of the valuable metals contained therein in the necessary degree of purity.

Relatively recent developments in the refining of certain metal ores, particularly those known as the manganiferous ores, such as the nodule ore, have included processes utilizing high temperatures wherein the metal values, specifically nickel, cobalt, copper and manganese and sometimes iron, have been converted to their respective halides and then fused or sublimed to form a fluid, i.e. liquid or vapor, metal halide mixture.

Ocean floor nodules have been refined by a variety of methods including anhydrous halidation, utilizing a vaporous halidation medium, e.g. hydrogen chloride vapor or chlorine, with or without a separate reducing agent, or molten alkali or alkaline earth metal halides, with or without a separate reducing agent. Generally, the nodule ore is crushed, ground and dried, reacted with the halidation agent, and optional reducing agent, to form the halides of the metal values present in the ore and heated to temperatures sufficiently high to cause the rapid vaporization of the metal halides thus formed. The vaporized metal halides, comprising nickel, copper, cobalt and manganese, and in some cases iron, are removed overhead and then condensed. Alternatively, if alkali or alkaline earth metal halides were to be used as the halidation agent, the reaction occurs in a molten bath of the alkali or alkaline earth metal halides or mixtures therof, into which the nickel, cobalt, copper and manganese halides dissolve as they are formed. The nickel, cobalt, copper and manganese halide can be vaporized from the molten bath. See, for example, the chloridation vaporization procedures disclosed in German Patent Specification No. P2126175.6-24, and copending commonly assigned U.S. applications, Ser. Nos. 40565, 40587, 40564 and 40590 filed May 26, 1970.

In the above process, the vaporized halides are condensed and then dissolved to form an aqueous solution. The metal values are individually separated from the solution of halides by a series of procedures including extracting with a liquid ion exchange agent and cementation.

Alternatively, the molten bath from the alkali and/or alkaline earth metal halide treatment was separated from the ore, dissolved to form an aqueous solution, and this solution treated to separate out the individual metal halides, as by liquid ion exchange procedures.

The known separation procedures, regardless of how the halides were obtained and dissolved, all required the consecutive separation of the iron if present, copper, cobalt and nickel halides followed by the removal of trace metals, as by precipitation, finally leaving a relatively pure stream of manganese halide. Therefore, the relatively large quantity of manganese halide had to be handled throughout the entire separation procedure.

U.S. Pat. No. 2,733,983, discloses a process for refining nickeliferous ores containing low concentrations of nickel and cobalt, e.g. low grade laterite and serpentine ores, such ores also contain, in addition to nickel and cobalt, iron, magnesium, silicon, etc. Such ores are refined by first oxidizing the ores and then chloridizing the nickel and cobalt values in the ores without chloridizing the undesirable materials in the ore. The ore is reacted with ferric chloride at temperatures at which the ferric chloride is in the vapor state; the temperature is then increased to about 1000°C after the ferric chloride has been removed to volatilize the nickel and cobalt halides previously formed by reaction with ferric chloride. The sublimed cobalt chloride and nickel chloride are removed and condensed. The nickel and cobalt chlorides can be fractionated by differential evaporation or condensation if desired. The chlorides are then reduced to the elemental metal by various methods including initial reconversion to the oxides and reduction with carbon, reducing the crystallized chlorides to the metal by reacting with hydrogen to form finally divided metal and hydrogen chloride, or electrolysis of an aqueous solution of the halides to reduce the halides to the metal.

Manganiferous iron ore has been chloridized by reaction with calcium chloride or sodium chloride followed by volatilization of the manganese chloride and other metal chlorides which are thereby formed. The mixed metal chloride vapor which is formed by this chloridation technique at approximately 1100°C is condensed as a dry product and then dissolved to form an aqueous solution. Any iron chloride formed is converted and precipitated as iron oxide. The manganese chloride can also be precipitated as a manganous hydroxide by the addition of alkali. See U.S. Department of the Interior, Bureau of Mines, Information Circular 8160, "Review of Major Proposed Processes for Recovering Manganese from U.S. Resources;" (2) "Chloride and Fixed Nitrogen Processes" by Norman et al.

Pyrites ores have been initially roasted and then chloridized using calcium chloride; the various non-ferrous metals, for example, copper, zinc silver, lead and bismuth are volatilized in the form of their chlorides, the chloride vapors are condensed and leached in to an aqueous solution from which the various metal values are then segregated. Generally, the metal chlorides are condensed by a wet spray method to immediately form the aqueous solution of the mixed metal chlorides.

Methods used for reducing metal halide to the elemental metal include passing the aqueous solution of a condensed metal halide or halides over another metal, high on the electromotive scale, in a cementation process, to obtain the less active metal or metals; for example, "cement" copper has been prepared by passing solutions containing copper chloride over scrap iron. Solutions containing cadmium, titanium and indium chlorides passed over finely divided zinc metal result in a cadmium-titanium-indium cementate. In all cases, however, the halides were first condensed and dissolved into an aqueous solution. Also, see Chemical Engineering, Apr. 8, 1968, pages 114–116, "*Japanese Process Makes Blast Furnaces Feed Pyrite Concentrate*" and Habashi, *Principles of Extractive Metallurgy*, Volume 2, "Hydrometallurgy", (Gordon and Breach Science Publishers.)

It has now been discovered that when refining nodule ore to obtain the metal values, by way of the metal halides, it is not necessary to condense and dissolve the metal halides to form an aqueous solution before reducing the metals to the desired elemental state; it also now is possible to make an initial separation of the manganese halide and the other valuable metal halides e.g. nickel, copper and cobalt halides eliminating the need to carry manganese throughout an entire separation procedure. In accordance with the present invention, this can be accomplished by maintaining the metal halides at the elevated temperatures at which the halides are in the fluid condition, i.e., a molten liquid or a vapor, and contacting the fluid mixed halides, comprising nickel halide, copper halide, cobalt halide, and manganese halide, and optionally iron halide, with solid manganese metal or iron metal as the precipitating metal, to result in the formation of nickel, copper and cobalt metals.

The process of the present invention results in the formation of a desired elemental metal directly from an anhydrous fluid state metal halide. Thereby the effective separation of metals of different relative reactivity such as nickel, copper and cobalt, from manganese and/or iron can be obtained. As detailed avove, the primary metal values in the nodule ores are manganese and iron. Thus, depending upon the procedure used for halidating the ore, manganese and/or iron halides are the primary components of the halide vapors. Manganese and iron, however, are not the most valuable metals, and therefore, it is desirable to separate their halides from the remaining, more valuable, nickel, copper and cobalt halides. This is readily accomplished by the use of the process of the present invention.

The following reaction equations exemplify the process of this invention utilizing iron or manganese as the precipitating metal and nickel, copper and cobalt as the precipitated metal:

$NiCl_2 + Fe \rightarrow FeCl_2 + Ni$
$CuCl_2 + Fe \rightarrow FeCl_2 + Cu$
$2 CuCl + Fe \rightarrow FeCl_2 + 2 Cu$
$CoCl_2 + Fe \rightarrow FeCl_2 + Co$
$MnCl_2 + Fe \rightarrow$ No reaction
$2FeCl_3 + Fe \rightarrow 3FeCl_2$
$NiCl_2 + Mn \rightarrow MnCl_2 + Ni$
$CuCl_2 + Mn \rightarrow MnCl_2 + Cu$
$2 CuCl + Mn \rightarrow MnCl_2 + 2 Cu$
$CoCl_2 + Mn \rightarrow MnCl_2 + Co$
$MnCl_2 + Mn \rightarrow$ No reaction
$2FeCl_3 + 3Mn \rightarrow 3MnCl_2 + 2Fe$ As shown above, when utilizing iron as the precipitating metal, only the nickel, copper and/or cobalt plus the other less active metals present in trace amounts are precipitated out and the manganese and iron halides remain in the halide vapor stage. The manganese halide and the iron halide can be readily separated by fractional condensation of the vapors. Manganese halide condenses at a substantially higher temperature than ferrous halide.

Alternatively, the mixed vaporous manganese and iron halides can be reacted with elemental halogen, e.g. chlorine, to oxidize the ferrous halide to ferric halide which is then even more readily separated from manganese halide by either fractional condensation or reaction with water at above about 200°C to form iron oxide, which is insoluble in water.

The above equations show the use of the chlorides; however, bromides and iodides can also be used. Chlorides and bromides are preferred because of their greater solubility in water and greater stability.

If it is desired to obtain a pure stream of manganese halide, it is preferred to use manganese as the precipitating metal because iron precipitates out with the nickel, copper and cobalt, leaving substantially pure $MnCl_2$ in the fluid stream.

The process of the present invention must be carried out at a temperature sufficient to maintain the metal halides in a fluid, i.e. molten or vaporous, state. Accordingly, the temperature should be at least about 400°C but generally not greater than about 1500°C and preferably not above about 1200°C. Optimally the temperature is in the range of from about 800° to about 1000°C when utilizing a vapor phase mixture of halide compounds and in the range of from about 450° to about 600°C when utilizing a molten phase halide.

Generally pressure has substantially no effect on the course of the present reaction and as such substantially atmospheric pressure can be utilized. However, if desired as a means of maintaining the halides in the vapor phase at lower temperatures the pressure can be reduced to below atmospheric. However, the savings are relatively small and, therefore, it is questionable whether it is economically worth while to operate at below atmospheric pressure.

However, where the halide vapors are withdrawn from the halidation stage at a pressure substantially below atmospheric, it may be economical to maintain that pressure when passing through the metal bed.

Often, the vaporized metal halides are admixed with a carrier gas. The use of a carrier gas permits the rapid vaporization and removal of the vapors even at temperatures substantially below the actual boiling point of the solids. The carrier gas is a material which is inert to, or at least not detrimental to, the halides and also should be nonreactive to the precipitating metal, i.e., manganese and iron, in the process of the present invention. Preferred carrier gases include nitrogen, carbon dioxide, and the inert gases such as argon, helium or neon. Gases such as chlorine and hydrogen chloride, often used as reagents in the preparation of halides from ores, should not be used as the carrier gases, and indeed should be removed prior to the contact with the metal in this process, as they tend to react with iron or manganese.

Any suitable contact apparatus can be utilized for carrying out the process for this invention. preferably, the precipitating metal is in the solid state. Accordingly solid-liquid or solid-vapor contact devices can be used. For example, when utilizing a vaporous halide, the iron or manganese metal can be in a particulate bed. The vaporous halide can be passed downwardly, upwardly or horizontally through the particulate bed. The primary aim is to insure contact of the mixed fluid metal halides with the greatest surface area of the iron or manganese.

A surprising aspect of this invention is that in a preferred procedure, when solid iron or manganese is used, there is no difficulty in physically separating the precipitated metals, e.g., copper, nickel, cobalt, from the iron or manganese. The precipitated metals form as discrete particles, readily separated from the precipitating metal and not blocking the surface from further reaction. As a result, this procedure can be carried out until substantially all of the iron or manganese has been reacted, leaving the reaction vessel filled only with the precipitated metal: copper, cobalt and nickel.

Therefore, in a continuous operation, the portion of the metal initially contacted with the halide vapor is eventually completely converted and the precipitated metals can be removed being replaced by additional fresh precipitating metal.

The precipitating metal can be housed in a single column, either horizontal or vertical, and the fluid halides passed from one end to the other; the precipitated metal being removed from the inlet end as fresh precipitating metal is added at the outlet end. Alternatively, and generally more preferable, is to use a series of vessels in cascade series, the fluid halides sequentially passing through the vessels. The iron or manganese in the initial vessel would be used up first, this could then be taken out of the series, a vessel containing fresh metal added at the end, and the precipitated metal removed and replaced by fresh iron and manganese.

Thus a continuous procedure can be carried out by arranging the piping of the cascading series of vessels to permit switching the vessels as described above. This is generally simpler than adding and removing metals from a single column.

The precipitated metals can be separated from any remaining iron or manganese by chemical or mechanical methods. The precipitated metals generally are formed in relatively small particles, which are readily separated from the usually far larger particles of iron and manganese by, for example, sieving or screening techniques. Where iron metal is used, separation can be accomplished utilizing magnets. Any other suitable separation techniques could be used, for example, flotation.

Chemical separation can be accomplished by selectively dissolving the precipitated metals. For example, an aqueous ammoniacal carbonate solution can be used to selectively dissolve cobalt, nickel and copper from iron.

The iron and manganese precipitating metals should be present in the most economical form possible. For example, the iron can include iron scrap which, however, can contain substantial proportions of other metals. A preferred material is sponge iron, in the form of pellets, which contains better than 90% or 91% elemental iron. Such sponge iron pellets are produced for example by the SL/RN direct reduction process when utilizing high grade iron ore. Such sponge iron pellets can have a diameter range of from about 1 to about 20 millimeters and preferably from about 10 to about 15 millimeters. The pellets are reasonably pure in iron and, therefore, the proportion of impurities found in the precipitated material is very low. The precipitated metals, copper, cobalt and nickel, for example, can be readily mechanically extracted from the relatively coarse sponge iron pellets in a gaseous fluid bed.

Two forms of iron, economical but not as effective as the sponge iron, are steel turnings and shredded and/or crushed detinned cans. These materials are available commercially at extremely low cost and are sufficiently active and of useful particle size.

The manganese metal is also preferably in the form of pellets and can be obtained by recycling the manganese metal produced from nodule ore.

For example, when utilizing the ocean floor nodule ore, manganese is present in many orders of magnitude greater than the other metals such as nickel, copper and cobalt. The amount of the manganese metal which must be utilized for obtaining these more valuable materials is a relatively small proportion of the manganese obtained from the refining operation of nodule ore.

The fluid mixtures of metal halides treated in accordance with this invention include both vapours and molten materials. One halidation treatment for ores which can produce either the vaporous halide mixture, or a molten mixture of halides, depending upon the temperature, is halidating ocean floor nodule ore utilizing a molten bath of alkali and/or alkaline earth metal halides.

The halidation of ocean floor nodule ores utilizing an alkali metal halide and/or an alkaline earth metal halide can be carried out at a temperature of from about 380° to about 800°C wherein the ore is immersed in the molten bath, the proportion of the molten halide-to-ore being at least 1:1 by weight. A molten reaction mixture comprising the alkali and/or alkaline earth metal halides plus metal halides derived from the metal values from the ocean floor nodule ore can be separated from the remaining solid detritus, or gangue, of the nodule ore and this molten mass flowed in contact with the manganese or iron metal. The alkali metal and/or alkaline earth metal halides are not affected by the iron or manganese metal and only the more valuable metals such as copper, nickel and cobalt precipitate out. Alternatively, the temperature of the molten reaction mixture and ore can be raised to vaporize the metal halides of cobalt, copper, nickel and manganese which can be removed as a vapor and flowed in contact with the iron or manganese.

The precipitated metals obtained by this process can be further treated as desired in order to separate out the individual metal values. Preferably, the elemental metals are dissolved into aqueous solutions by an aqueous leach liquid, i.e. an ammoniacal carbonate solution, and the individual metal values separated by liquid ion exchange procedures to obtain substantially pure streams of a cobalt value, a nickel value, and a copper value.

The liquid ion exchange procedure can be carried out using as the extraction agents water-immiscible solutions of alpha-hydroxyoximes (such as are disclosed in U.S. Pat. No.'s 3,224,873; 3,276,863 and 3,476,378) or 8-hydroxyquinolines (such as are disclosed in South African Specification No: 69/4397). The above reagents are preferably dissolved in water-immiscible organic solvents. For procedures utilizing these extraction agents, see, for example, German unexamined patent specification No. 2,126,223, published Jan. 13, 1972 and No. 2,152,696, published May 31, 1972.

Preferred examples of the process in accordance with the present invention are set forth below: these are to be considered as exemplary but not exclusive of the scope of the present invention:

EXAMPLE I

Samples of Pacific Ocean floor nodule ores containing the following metal values in chemically combined form were obtained:

| METAL VALUE | Percent by Weight of Metal |
|---|---|
| Manganese | 27.7 |
| Iron | 6.0 |
| Nickel | 1.3 |
| Copper | 1.1 |
| Cobalt | 0.26 |
| Other | Trace |

The above nodule ore was ground and dried and a 3 gram sample of the ground, dried ore was placed in a ceramic boat in a glass tube furnace and heated to 600°C. The tube furnace was connected to a second tube furnace containing steel wool by a conduit including a valve. The temperature of the tube furnace was maintained at 600°C while the stoichiometric amount of anhydrous hydrogen chloride required to react with the metal value in the ore was introduced in the form of a mixture with nitrogen (20% HCl, 80% $N_2$ by volume) over a period of two hours. The flow of HCl was then halted and the valve to the second furnace opened. The two furnaces were then heated to 900°C, and maintained at that temperature for two hours with nitrogen continuing to flow through the first furnace over the ceramic boat and into the second furnace. The resulting metal chloride vapors, carried by the nitrogen sparge, passed out of the first tube furnace and through the steel wool. The material in the second furnace was analyzed and was found to include an amount of nickel equal to 72% of that present in the ore, and amounts of copper and cobalt equal to 65% of each of those metals present in the ore. The vapor leaving the second furnace after passing through the steel wool was condensed and analyzed and found to include only manganese chloride and ferric chloride: the manganese being equivalent to 80% of the manganese in the ore.

EXAMPLE II

Another 3 gram sample of the dried nodule ore set forth in Example I was treated according to the process described in Example I but substituting particulate manganese metal having a maximum particle size of approximately ⅛ to ¼-inch.

Analysis of the metal precipitated around the manganese metal showed that approximately 71% of the nickel, 80% of the copper and 69% of the cobalt metal values present in the nodule were precipitated. In addition, approximately 95% of the iron present in the nodule was also obtained.

The vapors passing through the manganese metal were condensed and found to be substantially manganese chloride, substantially free of other metal contaminants.

The patentable embodiments of the invention which are claimed are as follows:

1. A process for obtaining metal values from ocean floor nodule ores, the ore comprising as major components the oxides of manganese and iron and as secondary components compounds of copper, cobalt and nickel, the process comprising halidating the nodule ore to form the halides of iron, copper, cobalt, nickel and manganese; vaporizing these halides to form a vaporous mixture comprising as the primary components manganese halide and iron halide and as the secondary components copper halide, cobalt halide and nickel halide; separating the nickel, cobalt and copper by passing the vaporous mixture of halides in contact with elemental iron in order to precipitate metallic copper, cobalt and nickel directly from the vapor; and contacting the metallic copper, cobalt and nickel with an aqueous ammoniacal carbonate solution so as to form an aqueous solution comprising dissolved cobalt, nickel and copper, substantially free from dissolved manganese and iron; whereby the nickel, copper and cobalt values from the ocean floor nodule ore are separated from the primary manganese and iron components, thus rendering the further treatment to obtain these individual values in a pure state more accessible.

2. The process in accordance with claim 1 comprising in addition, after contact with the metallic iron, fractionally condensing the remaining vapor so as to selectively condense manganese halides and thus obtain, in separate streams, manganese halide and iron halide.

3. The process in accordance with claim 1, comprising, in addition, after contact with the metallic iron, reacting the remaining vapors comprising iron halide and manganese halide with an elemental halogen so as to oxidize all of the iron halide to ferric halide and fractionally condensing the vapor so as to separate the ferric halide from the manganese halide.

4. The process of claim 1, wherein the halide is chloride.

5. The process of claim 4, wherein the iron and fluid mixture are contacted at a temperature of from about 800° to about 1000°C.

6. A process for obtaining metal values from ocean floor nodule ores, the ore comprising as major components the oxides of manganese and iron and as secondary components compounds of copper, cobalt and nickel, the process comprising halidating the nodule ore to form the halides of iron, copper, cobalt, nickel and manganese; vaporizing these halides to form a vaporous mixture comprising as the primary components manganese halide and iron halide and as the secondary components copper halide, cobalt halide and nickel halide; separating the nickel, cobalt and copper by passing the vaporous mixture of halides in contact with elemental manganese in order to precipitate metallic iron, copper, cobalt and nickel directly from the vapor and separating the remaining vapor therefrom; and selectively separating cobalt, nickel and copper from the iron by contacting the metallic cobalt, nickel, copper and iron with an aqueous ammoniacal carbonate solution to selectively dissolve cobalt, nickel and copper so as to form an aqueous solution comprising dissolved cobalt, nickel and copper and substantially free from iron and manganese; whereby the nickel, copper and cobalt values from the ocean floor nodule ore are separated from the primary manganese and iron components, thus rendering the further treatment to obtain these individual values in a pure state more accessible.

7. The process of claim 6 comprising in addition contacting the aqueous solution of nickel, cobalt and copper with a water-immiscible organic solution of a liquid ion exchange agent selected from the group consisting of alpha-hydroxyoximes and 8-hydroxyquinolines to selectively extract a pure metal value.

8. The process of claim 6 wherein the nodule ore is halidated by reaction with a hydrogen halide and vaporized to form a vapor phase mixture comprising, manganous halide, cobalt halide, nickel halide, copper halide and ferric halide.

9. The process of claim 6 wherein the nodule ore is halidated by reaction with an elemental halogen and the halides are vaporized to form a vapor phase mixture comprising manganous halide, cobalt halide, nickel halide and copper halide.

10. The process of claim 6 wherein the halide is selected from the group consisting of chloride and bromide.

11. The process of claim 6 wherein the mixed fluid halides are contacted with the elemental metal at a temperature in the range of from about 400° to about 1500° C.

12. The process of claim 6 wherein the elemental metal is in particulate form having a particle size not larger than about 20 mm. in diameter.

13. The process of claim 6, wherein the halide is chloride.

14. The process of claim 13, wherein the fluid and manganese are contacted at a temperature of from about 800° to about 1000° C.

15. A process for obtaining metal values from ocean floor nodule ores, the ore comprising as major components the oxides of manganese and iron and as secondary components compounds of copper, cobalt and nickel, the process comprising halidating the nodule ore to form the halides of iron, copper, cobalt, nickel and manganese; vaporizing these halides to form a vaporous mixture comprising as the primary components manganese halide and iron halide and as the secondary components copper halide, cobalt halide and nickel halide; separating the nickel, cobalt and copper by passing the vaporous mixture of halides in contact with elemental manganese in order to precipitate metallic iron, copper, cobalt and nickel directly from the vapor and separating the remaining vapor therefrom, wherein the elemental manganese is substantially completely reacted to form manganese halide; and selectively separating cobalt, nickel and copper from the iron by contacting the metallic cobalt, nickel, copper and iron with an aqueous ammoniacal carbonate solution to selectively dissolve cobalt, nickel and copper so as to form an aqueous solution comprising dissolved cobalt, nickel and copper and substantially free from iron and manganese; whereby the nickel, copper and cobalt values from the ocean floor nodule ore are separated from the primary manganese and iron components, thus rendering the further treatment to obtain these individual values in a pure state more accessible.

16. A process for obtaining metal values from ocean floor nodule ore, the ore comprising as major components the oxides of manganese and iron and as secondary components compounds of copper, cobalt and nickel, the process comprising halidating the nodule ore by reacting with a molten alkali metal or alkaline earth metal halide to form the halides of copper, cobalt, nickel and manganese; vaporizing these halides to form a vaporous mixture comprising as the primary component manangese halide and as the secondary components copper halide, cobalt halide and nickel halide; separating the nickel, cobalt and copper by passing the vaporous mixture of halides in contact with elemental manganese in order to precipitate metallic copper, cobalt and nickel directly from the vapor and separating the remaining vapor therefrom; and contacting the metallic cobalt, nickel and copper with an aqueous ammoniacal carbonate solution to dissolve cobalt, nickel and copper so as to form an aqueous solution comprising dissolved cobalt, nickel and copper and substantially free from iron and manganese; whereby the nickel, copper and cobalt values from the ocean floor nodule ore are separated from the primary manganese components, thus rendering the further treatment to obtain these individual values in a pure state more accessible.

* * * * *